US011275212B2

(12) United States Patent
Endo et al.

(10) Patent No.: US 11,275,212 B2
(45) Date of Patent: Mar. 15, 2022

(54) OPTICAL WAVEGUIDE CONNECTION STRUCTURE

(71) Applicant: Nippon Telegraph and Telephone Corporation, Tokyo (JP)

(72) Inventors: Jun Endo, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/978,352

(22) PCT Filed: Feb. 19, 2019

(86) PCT No.: PCT/JP2019/005995
§ 371 (c)(1),
(2) Date: Sep. 4, 2020

(87) PCT Pub. No.: WO2019/171933
PCT Pub. Date: Sep. 12, 2019

(65) Prior Publication Data
US 2021/0003782 A1    Jan. 7, 2021

(30) Foreign Application Priority Data
Mar. 9, 2018    (JP) .............................. JP2018-042734

(51) Int. Cl.
*G02B 6/30*    (2006.01)
*G02B 6/122*   (2006.01)
*G02B 6/26*    (2006.01)

(52) U.S. Cl.
CPC ............. *G02B 6/30* (2013.01); *G02B 6/1228* (2013.01); *G02B 6/262* (2013.01); *G02B 6/305* (2013.01)

(58) Field of Classification Search
CPC .......... G02B 2006/12102; G02B 2006/12195; G02B 2006/12061; G02B 6/12; G02B 6/30; G02B 6/305; G02B 6/32; G02B 6/262

(Continued)

(56) References Cited

U.S. PATENT DOCUMENTS

2001/0038737 A1*  11/2001  Imada ................... G02B 6/262
                                                                385/33
2002/0085826 A1*   7/2002  Matsumoto ............ G02B 6/30
                                                                385/137

(Continued)

FOREIGN PATENT DOCUMENTS

JP        04-130405 A   *  5/1992
JP        H08234062        9/1996
(Continued)

*Primary Examiner* — Michael P Mooney
(74) *Attorney, Agent, or Firm* — Slater Matsil, LLP

(57) ABSTRACT

An optical waveguide connection structure connects a Si waveguide and an optical fiber to each other with a bonding layer interposed therebetween. The Si waveguide has a core whose cross-sectional area in the direction perpendicular to the direction of propagation of light decreases toward the optical fiber, and a cladding that covers the core. The optical fiber has a fiber core, a fiber cladding that covers the fiber core, and a recess formed in an end face opposed to the Si waveguide. The bonding layer fills a gap between the end face of the Si waveguide and the end face of the optical fiber and the recess, and the bonding layer has a refractive index greater than the refractive index of the fiber core of the optical fiber.

9 Claims, 12 Drawing Sheets

(58) Field of Classification Search
USPC .................................. 385/33, 38, 43, 49–51
See application file for complete search history.

(56) References Cited

U.S. PATENT DOCUMENTS

| | | | | |
|---|---|---|---|---|
| 2012/0014646 | A1* | 1/2012 | Iannuzzi | G02B 6/262 |
| | | | | 385/33 |
| 2014/0177995 | A1* | 6/2014 | Mohammed | G02B 6/4214 |
| | | | | 385/14 |
| 2018/0011263 | A1* | 1/2018 | Kobayashi | A61B 1/0011 |

FOREIGN PATENT DOCUMENTS

| | | |
|---|---|---|
| JP | 200135037 | 12/2001 |
| JP | 200570557 | 3/2005 |
| WO | 2016151813 | 9/2016 |

\* cited by examiner (a)  (b)

OPTICAL WAVEGUIDE CONNECTION STRUCTURE

CROSS-REFERENCE TO RELATED APPLICATIONS

This application is a national phase entry of PCT Application No. PCT/JP2019/005995, filed on Feb. 19, 2019, which claims priority to Japanese Application No. 2018-042734, filed on Mar. 9, 2018, which applications are hereby incorporated herein by reference.

TECHNICAL FIELD

The present invention generally relates to an optical waveguide connection structure. In particular, it relates to a mode field conversion technique of converting a mode field diameter of input light before outputting the light.

BACKGROUND

In recent years, the amount of information transmitted in optical communication has been rapidly increasing, and the demand for higher integration of optical components has accordingly been growing. As a technique of achieving high integration of optical components, silicon photonics that uses silicon as a material to form an optical integrated circuit is known.

Silicon photonics uses a waveguide having a larger refractive index difference than conventional silica-based waveguides, and such a waveguide can have a reduced bending radius and be integrated with electronic circuits. In addition, silicon photonics uses a semiconductor manufacturing device similar to an integrated circuit and therefore can achieve high productivity. With these advantages, silicon photonics is under active research and development as an elemental technology for achieving further reduction in size and cost of optical components.

In silicon photonics, a waveguide is formed of a core made of silicon (Si) and a cladding made of silicon dioxide ($SiO_2$). With the state of the art, the Si waveguide can hardly achieve all optical functions by itself and therefore needs to be coupled with an active component, such as a laser diode (LD) or an amplifier, or a passive component, such as a photo diode or an optical fiber, for example.

In addition, the Si waveguide and the waveguide to be coupled to the Si waveguide have different mode fields, so that a structure that makes the spot sizes of the waveguides coincide with each other is needed to couple the waveguides to each other with high efficiency.

Patent Literature 1 discloses a mode field converter in an optical connection structure that connects a Si waveguide and an LD made of a compound semiconductor or a silica-based optical fiber to each other, and the mode field converter includes a core tapered in the direction of propagation of light formed on a substrate, and a cladding layer formed to surround the core.

Patent Literature 2 discloses a mode field converter in an optical connection structure that connects a Si waveguide and an LD made of a compound semiconductor or a silica-based optical fiber to each other, and the mode field converter includes a core whose width and thickness monotonically decrease formed on a substrate, and a cladding layer formed to define the thickness of the core.

The mode field converter described in Patent Literatures 1 and 2 provide improved coupling efficiency by using a waveguide having a tapered core and converting the spot size of the mode field while the light is guided in the tapered core.

CITATION LIST

Patent Literature

Patent Literature 1: Japanese Patent Laid-Open No. 8-234062
Patent Literature 2: Japanese Patent Laid-Open No. 2005-70557.

SUMMARY

Technical Problem

However, according to the techniques described in Patent Literatures 1 and 2, the mode field of the light emitted from the Si waveguide having the tapered core is not always converted into a plane wave suitable for coupling with an optical fiber as designed, because of manufacturing errors of the Si waveguide or the like. The deviation of the converted mode field from the plane wave is a cause of the degradation of the coupling efficiency between the Si waveguide and the optical fiber.

Embodiments of the present invention have been devised to solve the problem described above, and an object of embodiments of the present invention is to provide an optical waveguide connection structure that makes a mode field plane of light emitted from a Si waveguide closer to a plane wave to improve the coupling efficiency between the Si waveguide and an optical fiber.

Means for Solving the Problem

To solve the problem described above, an optical waveguide connection structure according to embodiments of the present invention is an optical waveguide connection structure that connects a first optical waveguide and a second optical waveguide with a bonding layer interposed therebetween, wherein the first optical waveguide has: a first core whose cross-sectional area in a direction perpendicular to a direction of propagation of light decreases toward the second optical waveguide; and a first cladding that covers the first core, the second optical waveguide has: a second core; a second cladding that covers the second core; and a recess formed in an end face opposed to the first optical waveguide, the bonding layer fills a gap between an end face of the first optical waveguide and the end face of the second optical waveguide and the recess, and the bonding layer has a refractive index greater than a refractive index of the second core of the second optical waveguide.

In the optical waveguide connection structure according to embodiments of the present invention, a boundary surface between the bonding layer and the recess formed in the end face of the second optical waveguide may form a part of an arbitrary curved surface.

In the optical waveguide connection structure according to embodiments of the present invention, a center of curvature of the curved surface may be located in the first optical waveguide beyond a position of an end face of the first optical waveguide opposed to the second optical waveguide.

In the optical waveguide connection structure according to embodiments of the present invention, the cross-sectional area of the first core of the first optical waveguide in the direction perpendicular to the direction of propagation of light may be smaller than a cross-sectional area of the second core of the second optical waveguide in the direction perpendicular to the direction of propagation of light.

Effects of Embodiments of the Invention

According to embodiments of the present invention, the bonding layer is formed between the end face of the Si waveguide and the end face of the optical fiber in which the recess is formed, the mode field plane of the light emitted from the Si waveguide can be made closer to a plane wave to improve the coupling efficiency between the Si waveguide and the optical fiber.

DETAILED DESCRIPTION OF ILLUSTRATIVE EMBODIMENTS

Figure 1:
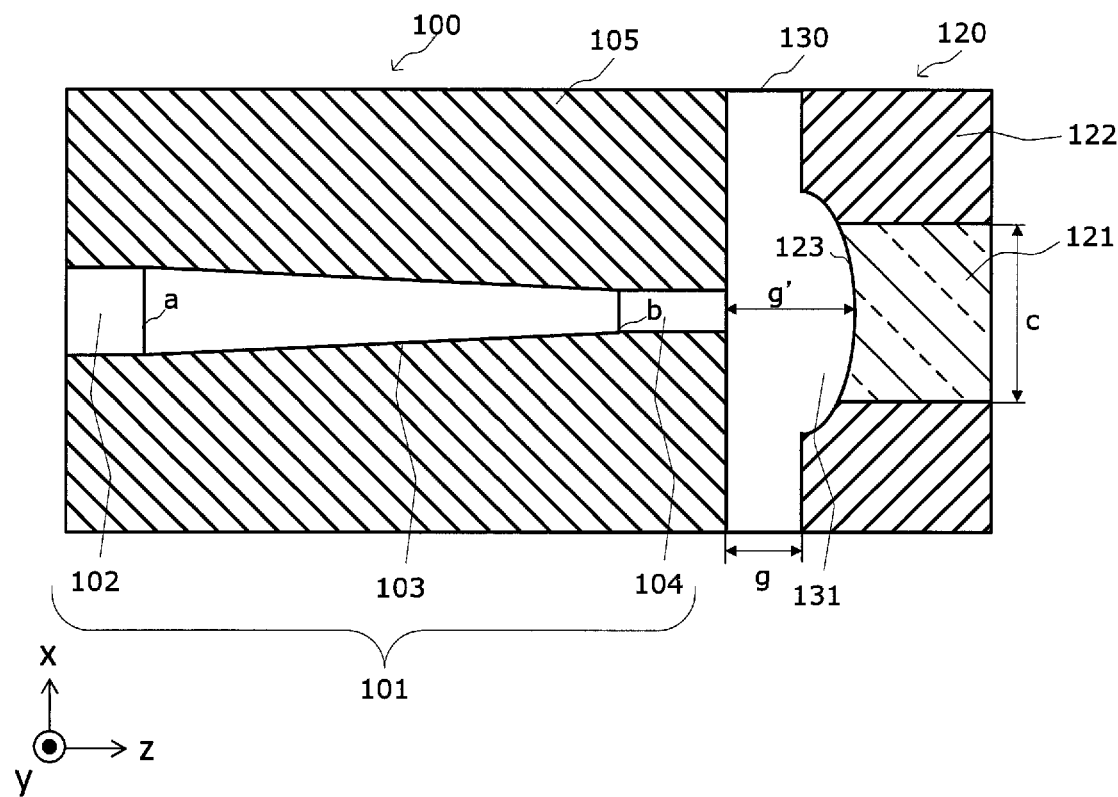
FIG. 1 is a schematic plan view of an optical waveguide connection structure according to an embodiment of the present invention.

In the following, an embodiment of the present invention will be described in detail with reference to FIGS. 1 to 12. Like components in the drawings are denoted by like reference numerals.

Embodiment

FIG. 1 is a schematic plan view of an optical waveguide connection structure 1 according to an embodiment of the present invention. The optical waveguide connection structure 1 according to this embodiment includes a Si waveguide (first optical waveguide) 100, an optical fiber (second optical waveguide) 120, a bonding layer 130 that connects the Si waveguide 100 and the optical fiber 120 to each other.

The optical waveguide connection structure 1 converts the mode field diameter of light input to the Si waveguide 100 before coupling the light to the optical fiber 120.

In the following description, in FIG. 1 and other drawings, the x-axis, the y-axis and the z-axis are perpendicular to each other, and the y-axis extends in the vertical direction, the x-axis extends in the horizontal direction, and the z-axis extends in the direction of propagation of light, that is, the direction along the optical axis.

This embodiment will be described with regard to an example where light is input to the Si waveguide 100 and propagates to the optical fiber 120.

First, a summary of the optical waveguide connection structure 1 according to this embodiment will be described.

The optical waveguide connection structure 1 according to this embodiment has the Si waveguide 100 and the optical fiber 120 optically connected to each other by the bonding layer 130, which has a lens structure. On the other hand, an optical waveguide connection structure 1B according to a prior art example shown in FIG. 12 has a bonding layer 130B filling the space between an end face of a Si waveguide 100 and a flat end face of an optical fiber 120, and the bonding layer 130B does not have the lens structure. In short, the optical waveguide connection structure 1 according to this embodiment is characterized by the bonding layer 130 having a lens structure.

In the following, components of the optical waveguide connection structure 1 according to this embodiment will be described.

The Si waveguide 100 includes a core (first core) 101 and a cladding (first cladding) 105 that covers the core 101.

The core 101 is tapered toward the optical fiber 120.

More specifically, the core 101 has a core end portion 102 provided on the light input side, a tapered portion 103, and a core end portion 104 provided on the side of the optical fiber 120.

The tapered portion 103 is tapered with the area of a cross-sectional area in an axis direction perpendicular to the direction of propagation of the light (z-axis) monotonically decreasing toward the optical fiber 120. For example, the tapered portion 103 is formed with the core diameter in the x-axis direction monotonically decreasing along the direction of propagation of the light (z-axis) and the core diameter in the y-axis direction fixed. Alternatively, the tapered portion 103 may be formed with not only the core diameter in the x-axis direction but also the core diameter in the y-axis direction monotonically decreasing along the direction of propagation of the light (z-axis).

The core end portions 102 and 104 extend in the opposite directions along the z-axis from end faces a and b of the tapered portion 103, respectively, that are perpendicular to the z-axis direction. More specifically, the core end portion 102 is continuously formed from the end face a of the tapered portion 103, which is on the opposite side to the optical fiber 120, to an end face of the tapered portion 103 at which the light is input to the Si waveguide 100. The core end portion 104 is continuously formed from the end face b of the tapered portion 103, which is on the side of the optical fiber 120, to an end face of the Si waveguide 100 on the side of the optical fiber 120.

That is, one end of the core end portion 102 is optically connected to the end face a of the tapered portion 103 on the side opposite to the side of the optical fiber 120. One end of the core end portion 104 is optically connected to the end face b of the tapered portion 103 on the side of the optical fiber 120.

The other end of the core end portion 104 is opposed to a fiber core (second core) 121 of the optical fiber 120 with the bonding layer 130 described later interposed therebetween.

The dimension of the cross section of the core end portions 102 and 104 in the x-axis direction is fixed in the direction of propagation of the light (z-axis), for example. For example, the core end portions 102 and 104 have a rectangular shape.

As another example, the core end portions 102 and 104 may be formed to at least have a fixed shape in the z-axis direction in plan view. For example, the whole of the core 101 may be tapered with the core diameter in the x-axis direction monotonically decreasing in the direction of the propagation of the light (z-axis).

The cross-sectional area of the core 101 in the plane perpendicular to the direction of propagation of the light (z-axis) is smaller than the cross-sectional area of the fiber core 121 of the optical fiber 120 described later in the plane perpendicular to the direction of propagation of the light (z-axis).

The core 101 having the core end portions 102 and 104 and the tapered portion 103 is made of a Si material. As for the size of the core 101, the dimension in the x-axis direction is 0.5 to 0.07 [μm], and the dimension in the y-axis direction is fixed to 0.2 [μm]. The core 101 has a refractive index of 3.5. Since Si is transparent to light having a wavelength of 1.3 to 1.6 [μm], light having a wavelength of 1.55 [μm] is input to the core 101 in this embodiment.

The cladding 105 is formed to cover the core 101. The cladding 105 is made of a silica-based material. In this embodiment, the cladding 105 has a refractive index of 1.44.

The core 101 and the cladding 105 of the Si waveguide 100 are sequentially formed on the same substrate in a well-known deposition technique, a well-known photolithography technique and a well-known etching technique.

The optical fiber 120 is connected to the Si waveguide 100 with the bonding layer 130 interposed therebetween. The optical fiber 120 includes the fiber core 121 and a fiber cladding (second cladding) 122 that covers the fiber core 121. A recess 123 having the shape of a spherical segment is formed in an end face of the optical fiber 120 on the side of the Si waveguide 100. The recess 123 will be described in detail later.

The optical fiber 120 is made of a silica-based material, for example. However, the optical fiber 120 may be made of other inorganic material than the silica-based material or organic materials (such as polymers). In this embodiment, the optical fiber 120 has a cutoff wavelength of 1.5 [μm].

The fiber core 121 is provided in a center part of the optical fiber 120 and transmits the light having the mode field converted by the Si waveguide 100. In this embodiment, a core diameter c of the fiber core 121 in the x-axis direction is 4 [μm], considering reduction of bending loss.

The fiber core 121 is not limited to the one having a circular cross section shown in FIG. 1 but may have a rectangular cross section like that of a planar light wave circuit, for example.

The fiber cladding 122 is formed to cover an outer peripheral surface of the fiber core 121. The fiber cladding 122 has a refractive index of 1.44, for example.

The bonding layer 130 optically connects the optical fiber 120 and the Si waveguide 100 to each other. The bonding layer 130 fills a gap g between the end face at the leading end of the tapered core 101 of the Si waveguide 100 and the opposed end face of the optical fiber 120 and the recess 123 formed in the end face of the optical fiber 120 described later.

Thus, the bonding layer 130 forms a lens portion 131 that protrudes in the direction of propagation of the light in conformity with the end face of the optical fiber 120. Therefore, the light having propagated through the core end portion 104 of the Si waveguide 100 is coupled to the optical fiber 120 through the bonding layer 130 having the lens portion 131.

The distance of the gap g between the end face of the Si waveguide 100 and the end face of the optical fiber 120 filled with the bonding layer 130 is 3 [μm], for example.

The material of the bonding layer 130 is an epoxy or acrylic resin, for example. The refractive index of the bonding layer 130 at the wavelength of 1.55 [μm] is higher than the refractive index of the fiber core 121 of the optical fiber 120 and, for example, ranges from 1.5 to 1.7.

The bonding layer 130 has a transmittance of 90% or higher at the wavelength of 1.55 [μm], a thermal expansion coefficient of $4 \times 10^{-5}/°$ C. or less, and a cure shrinkage of 2% or less. Furthermore, the viscosity coefficient of the bonding layer 130 can be adjusted in a range from approximately 100 to 1000 cP.

Next, a method of forming the recess 123 in the shape of a spherical segment on the end face of the optical fiber 120 for providing the bonding layer 130 with the lens portion 131 will be described with reference to FIG. 2.

Figure 2:
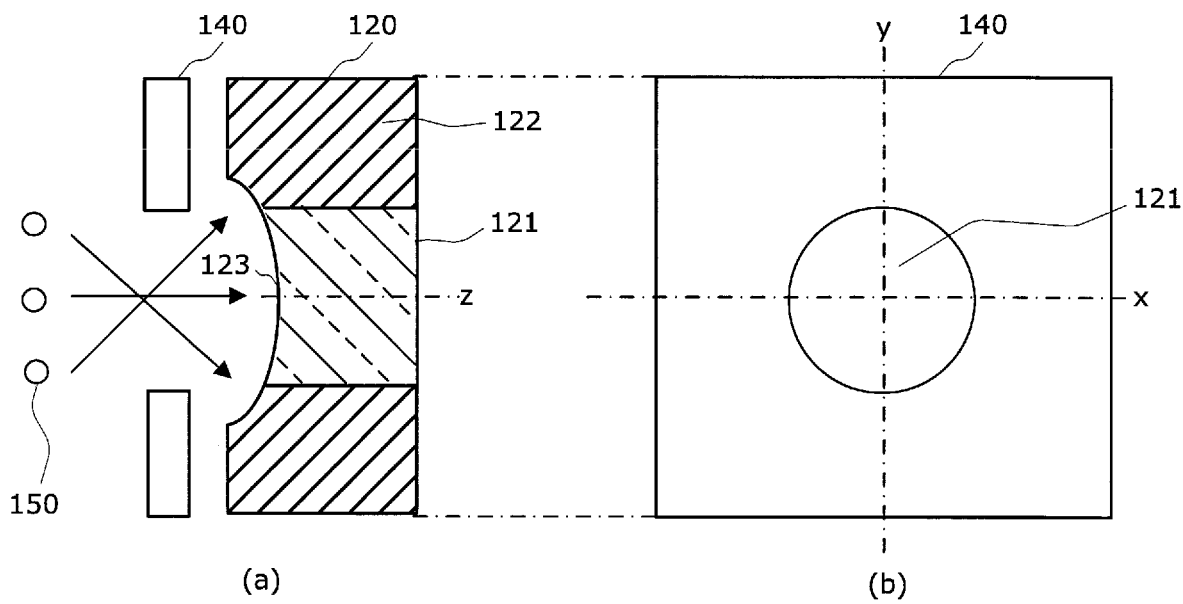
FIG. 2 is a diagram for illustrating an end face of an optical fiber according to the embodiment of the present invention.

As shown in the parts (a) and (b) of FIG. 2, the recess 123 in the shape of a spherical segment on the end face of the optical fiber 120 is formed by dry etching or the like.

More specifically, the end face of the optical fiber 120 is processed to form the recess 123 in the shape of a spherical segment by forming a mask 140, such as a metal film, on the end face of the optical fiber 120 and performing isotropic plasma etching on the mask 140 with ions 150 or the like from an etching device.

The part of the mask 140 through which the ions 150 pass has the shape of a circle having a diameter comparable to that of the fiber core 121 as shown in the parts (a) and (b) of FIG. 2. In this embodiment, the boundary surface between the bonding layer 130 and the recess 123 formed in the end face of the optical fiber 120 approximates to a spherical surface.

In this case, of the coordinates of the center of the recess 123, the x coordinate and the y coordinate coincide with those of the geometrical center of gravity of the cross section of the core 101 of the Si waveguide 100, and the z coordinate is located on the boundary surface between the bonding layer 130 and the Si waveguide 100. The radius of curvature of the recess 123 can be greater than a width g' of the bonding layer 130 in the z-axis direction. Therefore, the center of curvature of the curved surface of the recess 123 is located in the Si waveguide 100 beyond the end face of the Si waveguide 100 opposed to the optical fiber 120.

In this embodiment, the radius of curvature of the recess 123 is close to the diameter of the fiber core 121 of the optical fiber 120. For example, the radius of curvature is 3.8 [μm].

The recess 123 is not limited to the shape of a spherical segment and can have any shape as far as the boundary surface between the bonding layer 130 and the end face of the optical fiber 120 is a curved surface of a body of revolution, such as an ellipsoid or a paraboloid. This allows adjustment of the coupling efficiency of a horizontally polarized wave and a vertically polarized wave of the propagation light.

Next, light propagation and mode field conversion in the optical waveguide connection structure 1 configured as described above will be described.

In the optical waveguide connection structure 1, the mode field diameter of the light guided in the tapered core 101 of the Si waveguide 100 starts being gradually expanded before reaching the leading end portion of the tapered core 101, and then the light reaches the end face of the Si waveguide 100 and is radiated into the bonding layer 130 area.

The mode field distribution of the light radiated from the end face of the Si waveguide 100 depends on refractive indices of the core 101 and the cladding 105 of the Si waveguide 100, the angle of inclination of the tapered structure of the core 101, and the refractive index distribution of the bonding layer 130.

As described above, the mode field distribution of the light radiated from the Si waveguide 100 is desirably converted into a plane wave. However, depending on the manufacturing error of a structure parameter or the like, the mode field distribution may not be converted into a plane wave as designed. For this reason, with the optical waveguide connection structure 1 according to this embodiment, as shown in FIG. 1, the bonding layer 130 having the lens portion 131 is formed as a medium between the Si waveguide 100 and the optical fiber 120, thereby approximately converting the light radiated from the Si waveguide 100 into a plane wave.

In the following, mode field conversion in the optical waveguide connection structure 1 configured as described above will be described in detail with reference to FIGS. 3 to 5C.

Figure 3:
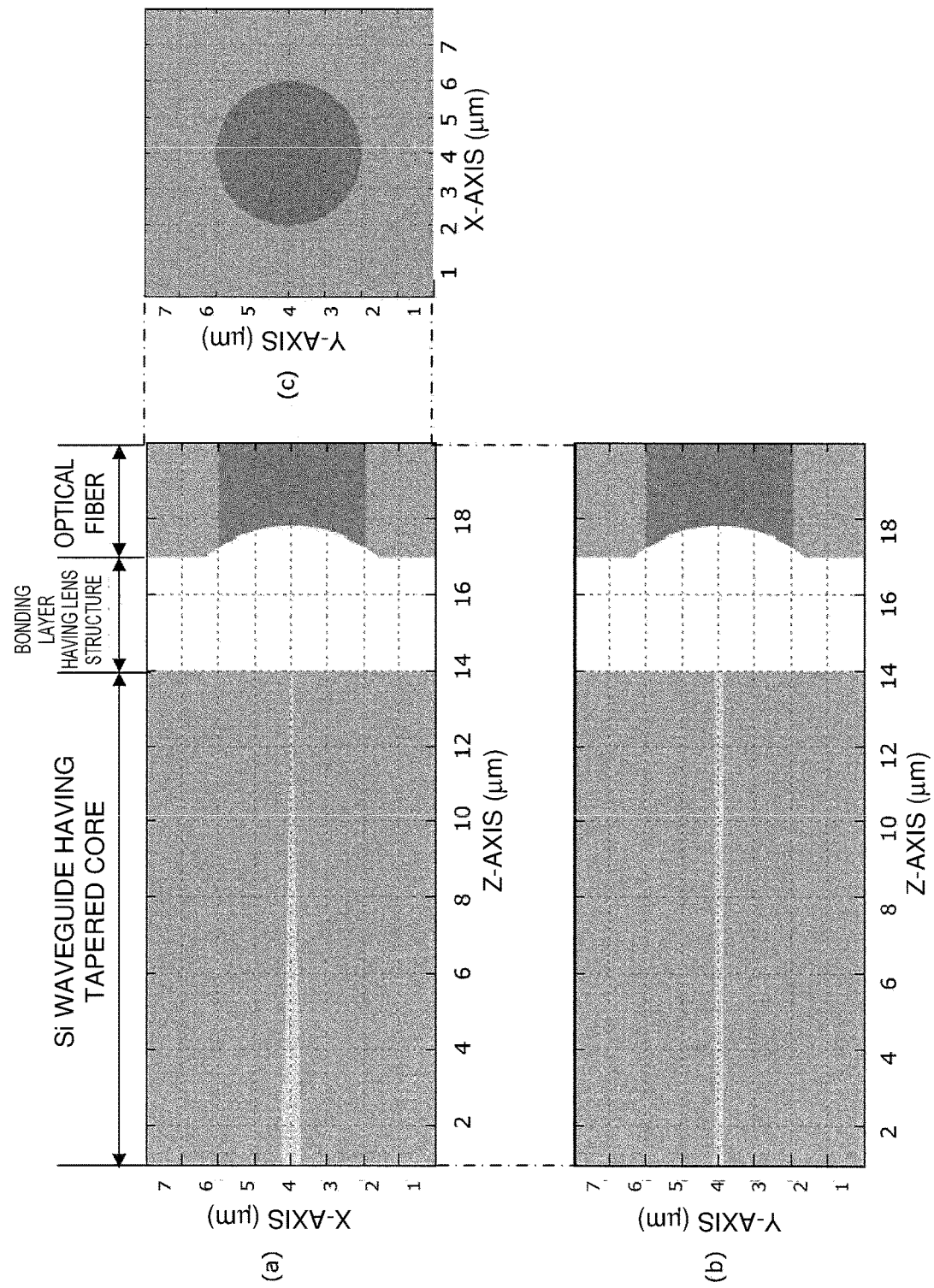
FIG. 3 includes three graphs showing a medium distribution of the optical waveguide connection structure according to the embodiment of the present invention.

First, with reference to the plan view of the optical waveguide connection structure 1 in the part (a) of FIG. 3, the side view of the optical waveguide connection structure 1 in the part (b) of FIG. 3 and the right side view of the optical waveguide connection structure 1 in the part (c) of FIG. 3, a result of calculation of a power distribution of an electromagnetic field will be described.

The electromagnetic field guided in the optical waveguide connection structure 1 is calculated in the three-dimensional finite difference time domain (FDTD) method. The electromagnetic wave propagates from the Si waveguide 100 toward the optical fiber 120.

Figure 4A:
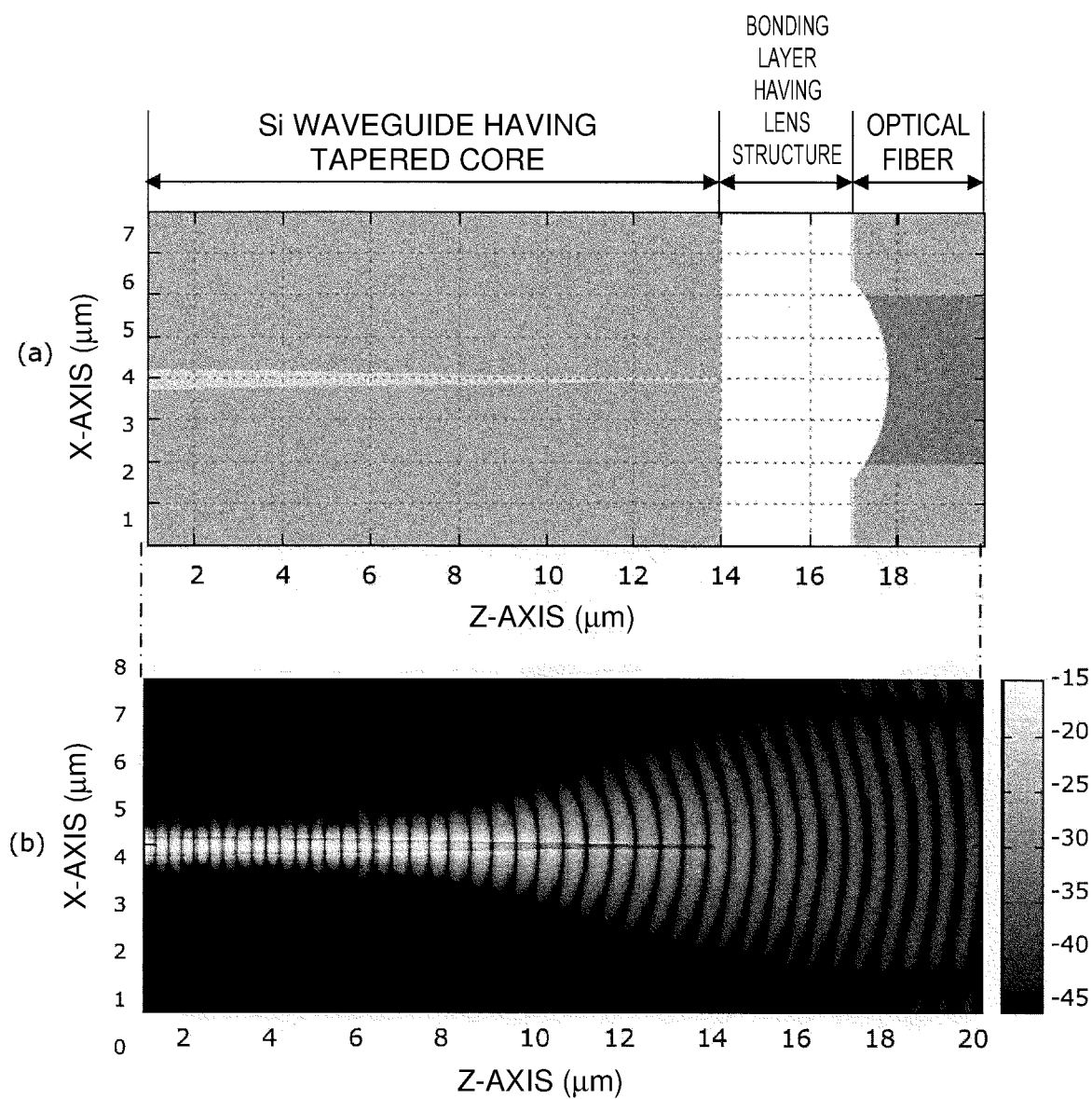
FIG. 4A is a diagram for illustrating an $E_x$ power distribution in a zx plane of the optical waveguide connection structure.
Figure 4B:
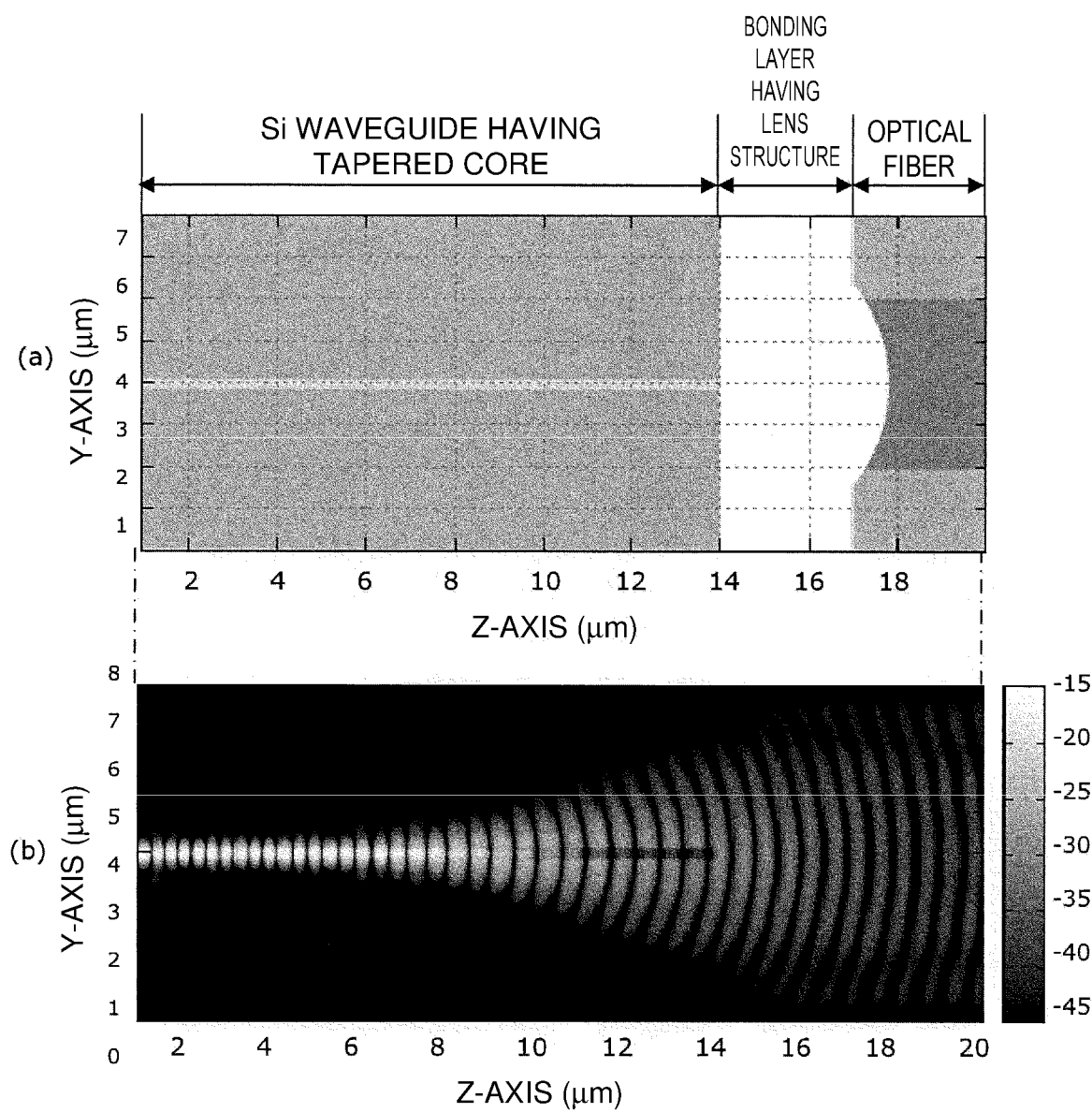
FIG. 4B is a diagram for illustrating an $E_x$ power distribution in a yz plane of the optical waveguide connection structure.

FIGS. 4A and 4B show $E_x$ power distributions [dB] in the zx plane and the yz plane, respectively, of a horizontally polarized wave (x-polarized wave: $E_x$ mode) incident on the Si waveguide 100. As shown in the parts (a) and (b) of FIG. 4A and the parts (a) and (b) of FIG. 4B, the horizontally polarized wave incident on the Si waveguide 100 propagates in the Si waveguide 100 in a fundamental mode. As the cross-sectional area of the tapered core 101 decreases along the direction of propagation, the mode field diameter is converted to be expanded until the wave reaches the boundary to the bonding layer 130.

In the bonding layer 130, the electromagnetic field propagates in a radiation mode and reaches the end face of the optical fiber 120. Immediately after the electromagnetic field is incident on the optical fiber 120, the mode field contains both the radiation mode and a guided mode. In the optical fiber 120, the electromagnetic field in the radiation mode is diffused as the wave propagates, and only the wave in the guided mode remains after the electromagnetic field propagates several meters.

More specifically, the lens portion 131 of the bonding layer 130, which protrudes in the direction of propagation of the light, redirects a wave vector pointing outward from the core 101 to the center of the core 101. As a result, the electromagnetic wave is closer to a plane wave at the end face of the optical fiber 120 than immediately after the electromagnetic wave is emitted from the Si waveguide 100.

Figure 4C:
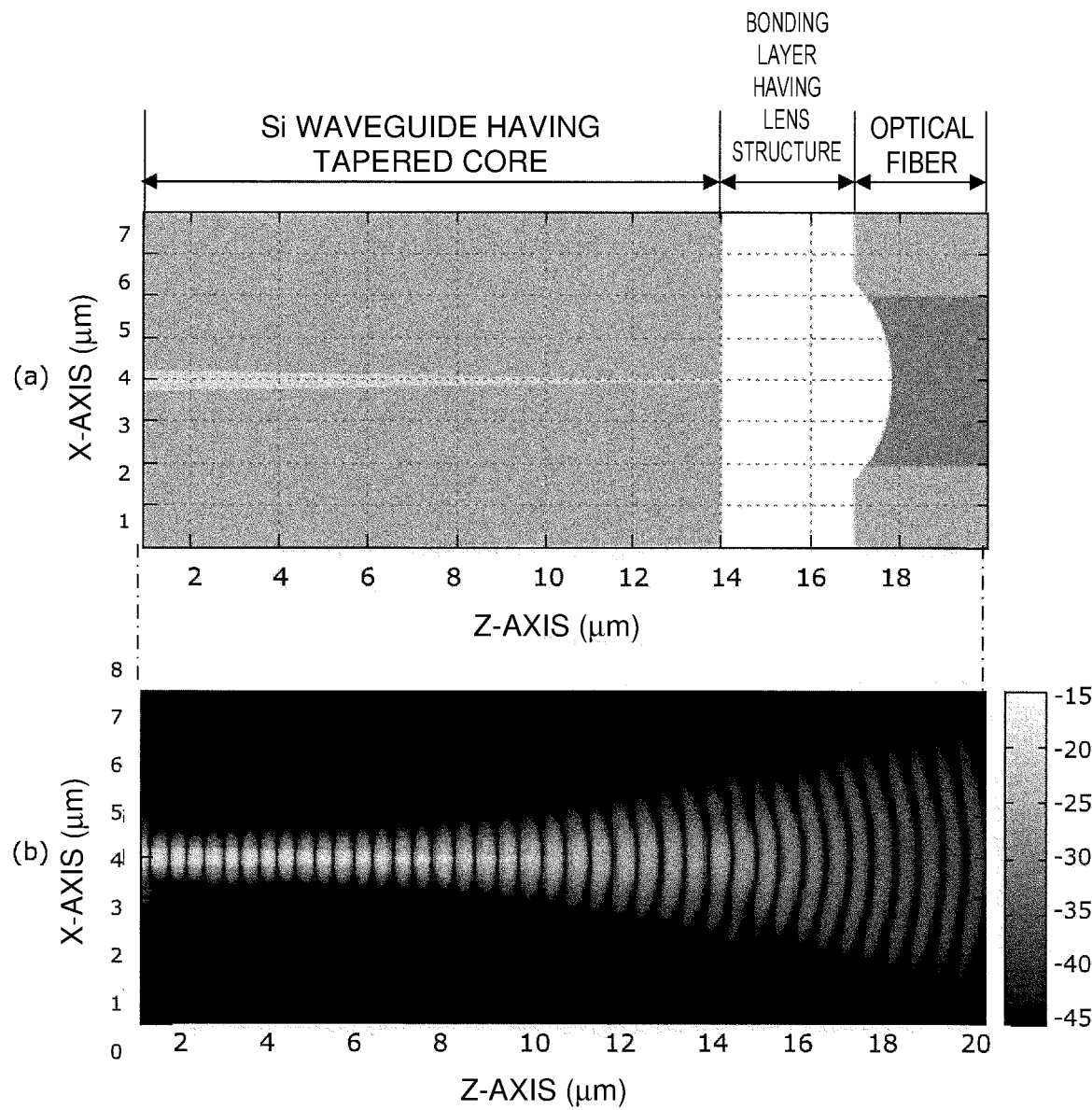
FIG. 4C is a diagram for illustrating an $E_y$ power distribution in the zx plane of the optical waveguide connection structure.
Figure 4D:
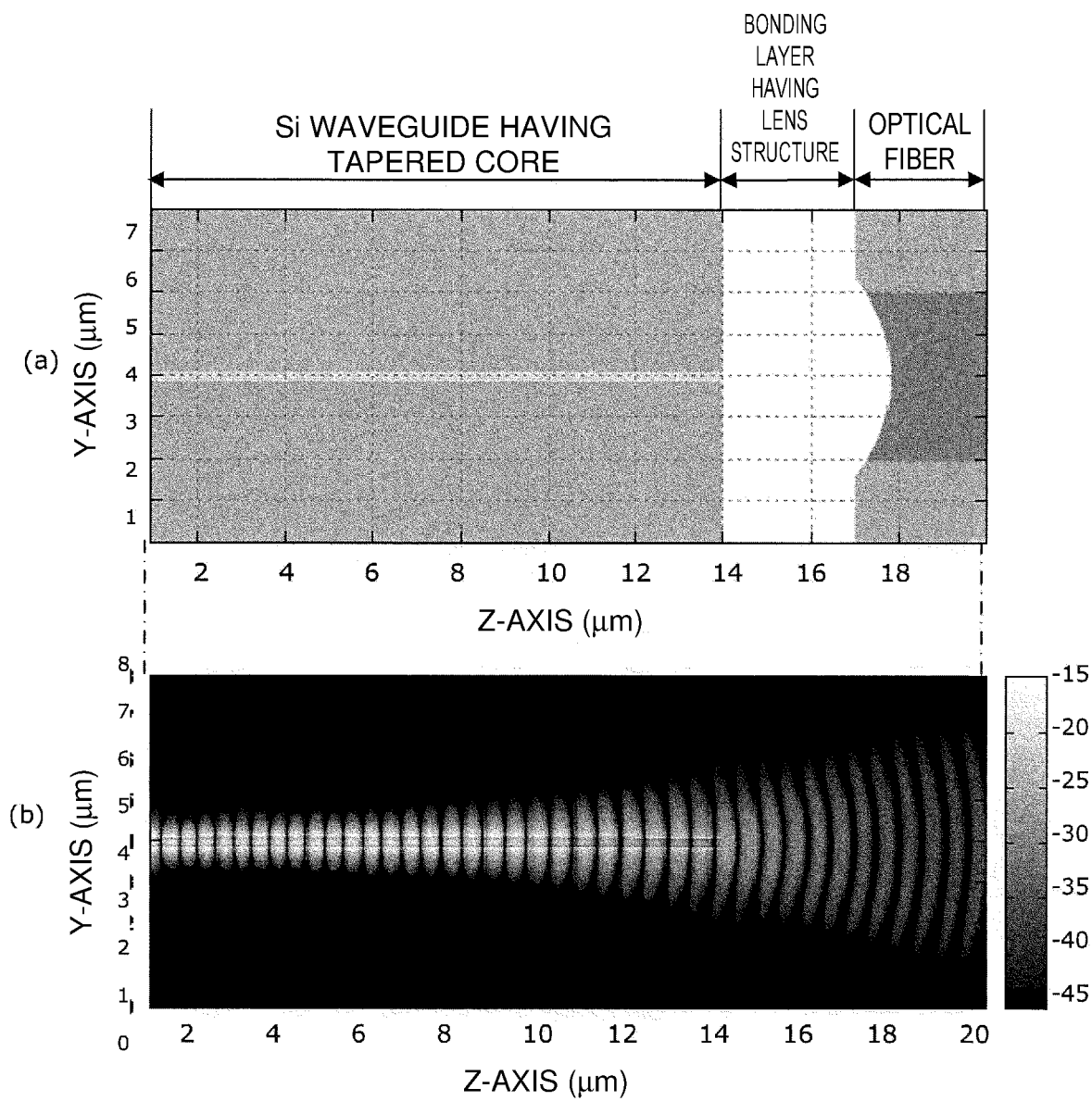
FIG. 4D is a diagram for illustrating an $E_y$ power distribution in the yz plane of the optical waveguide connection structure.

FIGS. 4C and 4D show $E_y$ power distributions [dB] in the zx plane and the yz plane, respectively, of a vertically polarized wave (y-polarized wave: $E_y$ mode) incident on the Si waveguide 100. As shown in the parts (a) and (b) of FIG. 4A and the parts (a) and (b) of FIG. 4B, as with the case of the $E_x$ mode, the electromagnetic wave is made, by the lens portion 131 of the bonding layer 130, closer to a plane wave at the end face of the optical fiber 120 than immediately after the electromagnetic wave is emitted from the Si waveguide 100.

Figure 5A:
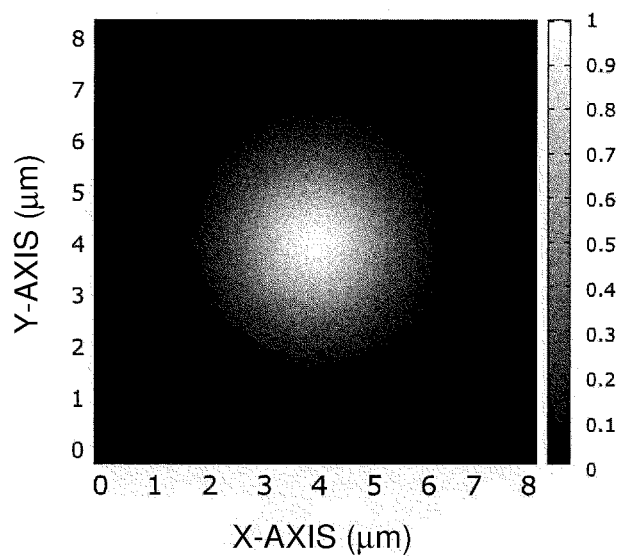
FIG. 5A is a diagram for illustrating a power distribution in an xy plane of the optical fiber.
Figure 5B:
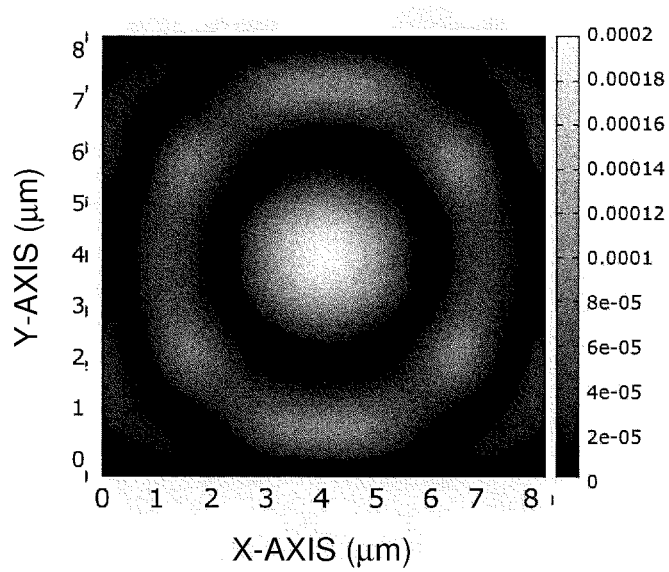
FIG. 5B is a diagram for illustrating the power distribution in the xy plane of the optical fiber.
Figure 5C:
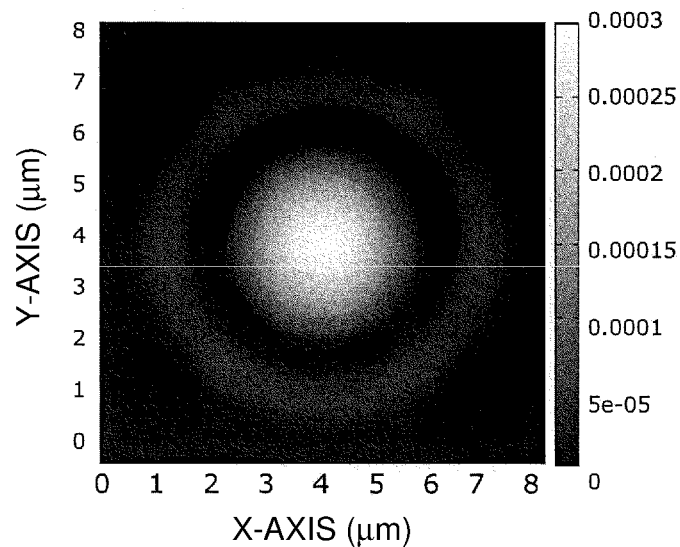
FIG. 5C is a diagram for illustrating the power distribution in the xy plane of the optical fiber.

FIG. 5A shows an eigenmode ($LP_{01}$ mode) in the xy plane of the optical fiber 120. FIG. 5B shows an example of the power distribution of the $E_x$ mode in the xy plane of the optical fiber 120. FIG. 5C shows an example of the power distribution of the $E_y$ mode in the xy plane of the optical fiber 120.

A coupling efficiency η of the optical waveguide connection structure 1 is determined according to the following Formula (1), provided that a reference plane perpendicular to the optical axis of the optical fiber 120, and the $E_x$ mode or $E_y$ mode and the $LP_{01}$ mode distributed in the reference plane are denoted by $\phi_1$ and $\phi_2$, respectively.

[Formula 1]

$$\eta = \frac{\left| \int\int \phi_1 \phi_2 dx dy \right|^2}{\int\int |\phi_1|^2 dx dy \int\int |\phi_2|^2 dx dy} \quad (1)$$

In the Formula (1), x denotes distance in the x-axis direction, and y denotes distance in the y-axis direction.

Figure 6:
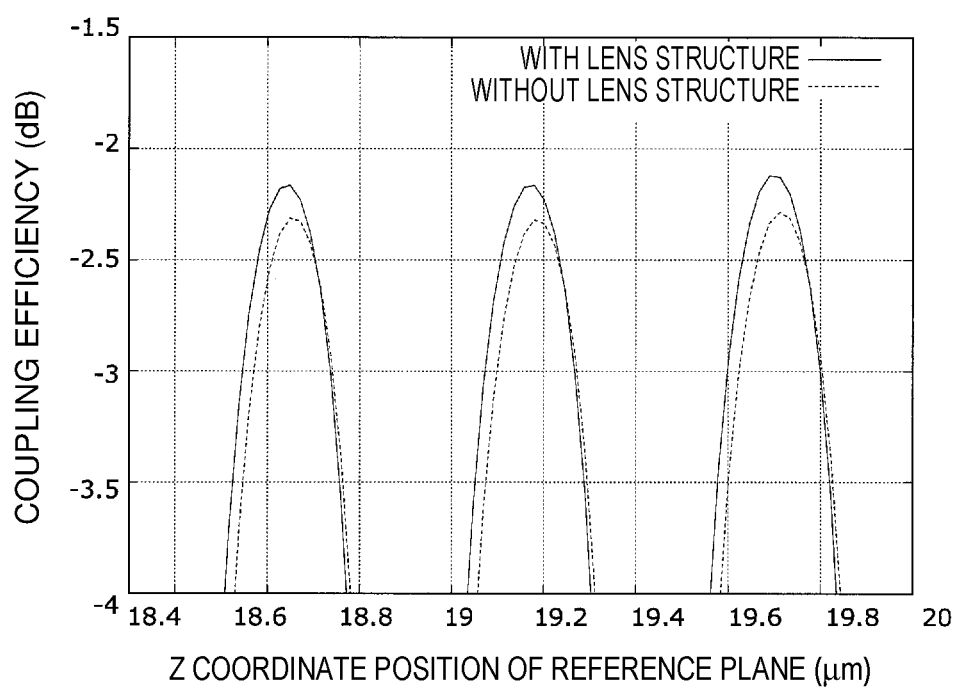
FIG. 6 is a graph for illustrating a dependency of a coupling efficiency on the position of a reference plane.

FIG. 6 shows the coupling efficiency determined for an input x-polarized wave by sweeping the coordinates of the intersection of the reference plane and the optical axis in the range of the region after propagation through the bonding layer 130.

In FIG. 6, the horizontal axis indicates z coordinate position of the reference plane, and the vertical axis indicates coupling efficiency. The solid curve indicates the coupling efficiency of the optical waveguide connection structure 1 according to this embodiment, which has the bonding layer 130 provided with the lens portion 131. The dashed curve indicates the coupling efficiency of the optical waveguide connection structure 1B according to the prior art example (FIG. 12), which does not have the bonding layer 130 provided with the lens portion 131.

As shown in FIG. 6, the electromagnetic wave propagates in the z direction as a transverse wave, and the value of the coupling efficiency periodically varies with the position of the reference plane in both the cases. As can be seen, the coupling efficiency of the optical waveguide connection structure 1 having the bonding layer 130 provided with the lens portion 131 is improved compared with the coupling efficiency of the optical waveguide connection structure 1B according to the prior art example.

Figure 7:
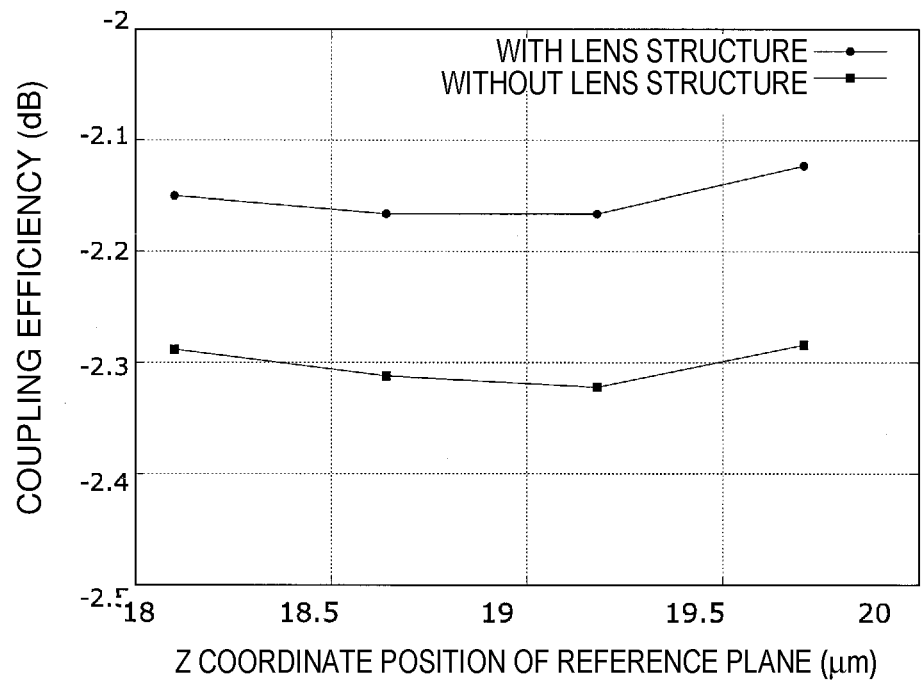
FIG. 7 is a graph for illustrating a relationship between the maximum value of the coupling efficiency and the position of the reference plane.

FIG. 7 shows plots of maximum values of the coupling efficiency as a function of the position of the reference plane. In FIG. 7, the horizontal axis indicates z coordinate position of the reference plane, and the vertical axis indicates coupling efficiency. The values indicated by circular dots are maximum values of the coupling efficiency of the optical waveguide connection structure 1 according to this embodiment, which has the bonding layer 130 provided with the lens portion 131. The values indicted by square dots are maximum values of the coupling efficiency of the optical waveguide connection structure 1B according to the prior art example, which does not have the lens portion 131.

As shown in FIG. 7, the optical waveguide connection structure 1 according to this embodiment has an improved coupling efficiency compared with the optical waveguide connection structure 1B according to the prior art example (FIG. 12), due to the effect of the lens portion 131 of the bonding layer 130 described above.

Figure 8:
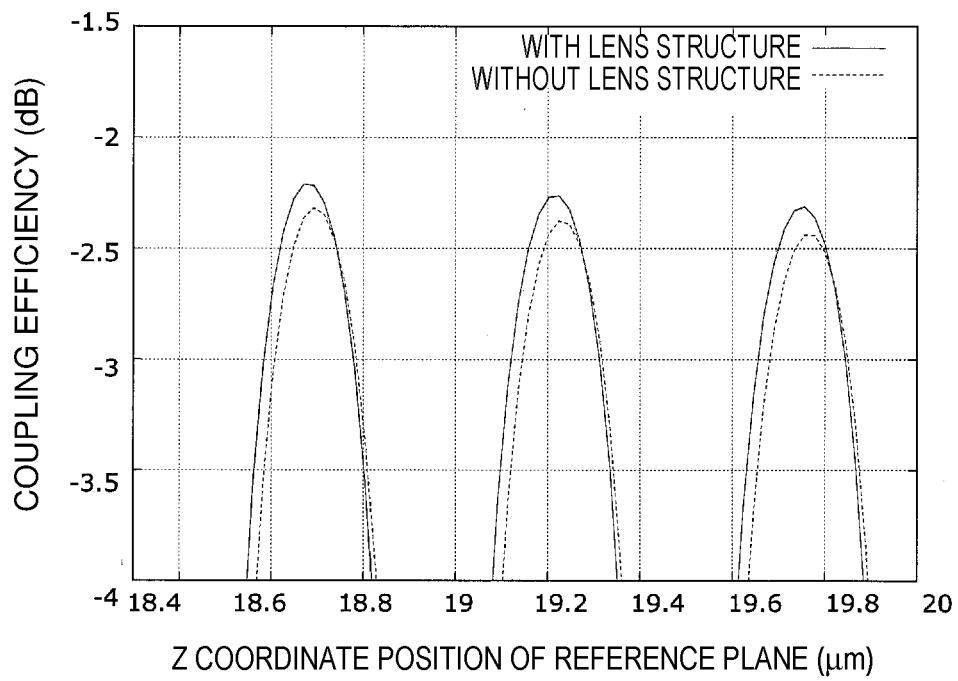
FIG. 8 is a graph for illustrating a dependency of a coupling efficiency on the position of a reference plane.
Figure 9:
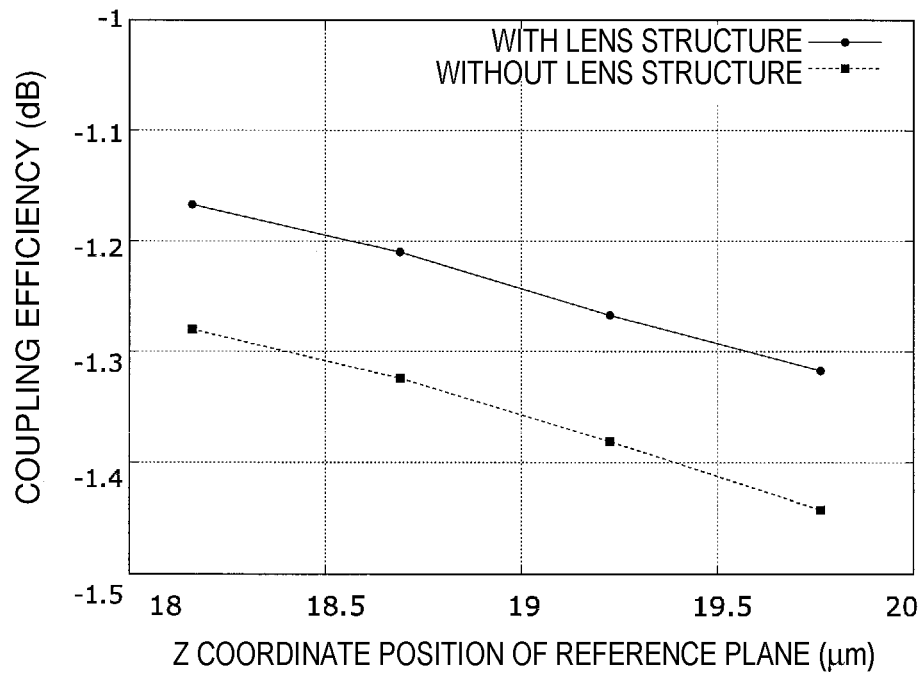
FIG. 9 is a graph for illustrating a relationship between the maximum value of the coupling efficiency and the position of the reference plane.

FIGS. 8 and 9 show the coupling efficiency for an input y-polarized wave calculated in the same manner.

Figure 12:
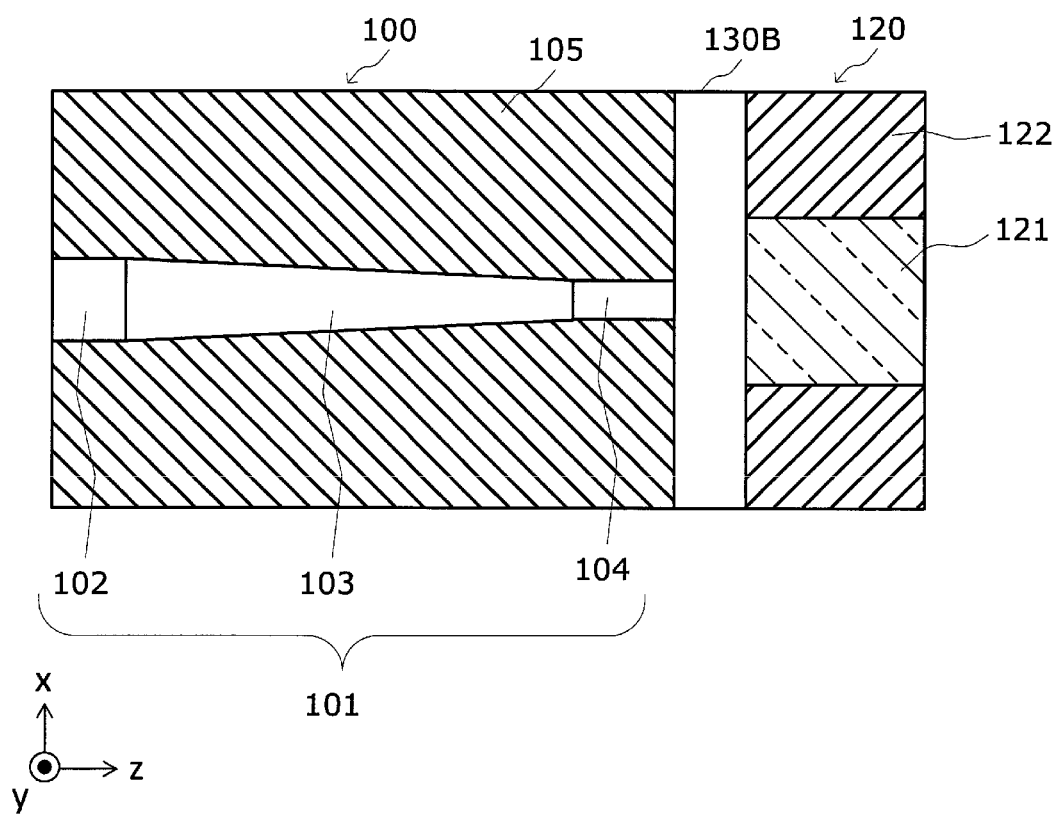
FIG. 12 is a schematic plan view of an optical waveguide connection structure according to prior art.

In FIG. 8, the solid line indicates the coupling efficiency of the optical waveguide connection structure 1 according to this embodiment, and the dashed line indicates the coupling efficiency of the optical waveguide connection structure 1B according to the prior art example (FIG. 12). As shown in FIG. 8, for the input y-polarized wave, the coupling efficiency of the optical waveguide connection structure 1 having the lens portion 131 is also improved compared with the coupling efficiency of the optical waveguide connection structure 1B according to the prior art example.

FIG. 9 shows plots of maximum values of the coupling efficiency for the input y-polarized wave as a function of the position of the reference plane. In FIG. 9, the values indicated by circular dots are maximum values of the coupling efficiency of the optical waveguide connection structure 1 according to this embodiment, which has the bonding layer 130 provided with the lens portion 131. The values indicted by square dots are maximum values of the coupling efficiency of the optical waveguide connection structure 1B according to the prior art example, which does not have the lens portion 131.

As can be seen, for the input y-polarized wave, the optical waveguide connection structure 1 according to this embodiment, which has the lens portion 131, also has an improved coupling efficiency compared with the optical waveguide connection structure 1B according to the prior art example.

As shown in FIGS. 6 to 9 and as described above, for both the input x-polarized wave and the input y-polarized wave, the coupling efficiency of the optical waveguide connection structure 1 can be improved by providing the bonding layer 130 with the lens portion 131.

Figure 10:
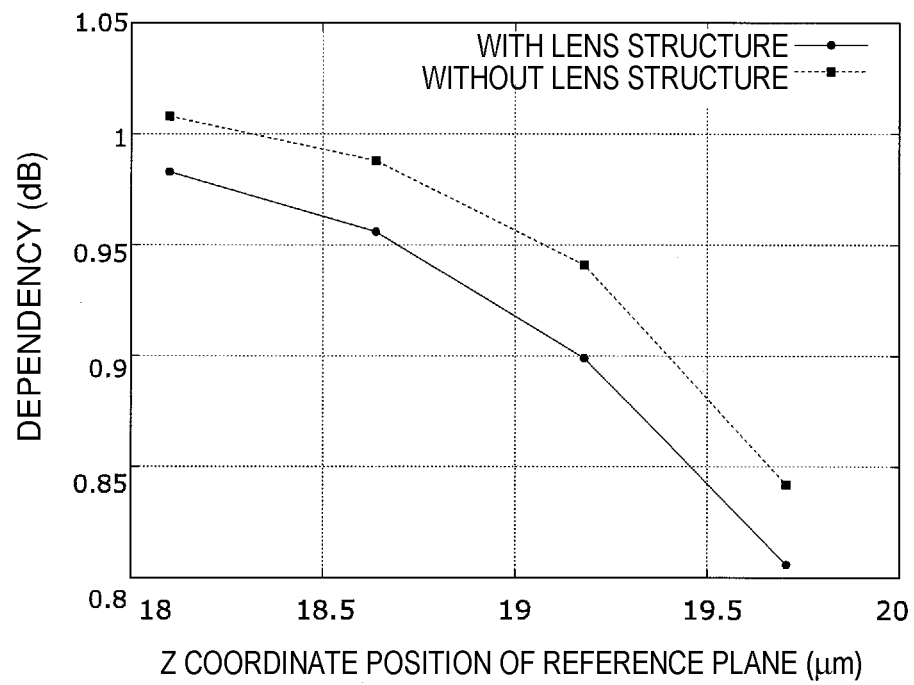
FIG. 10 is a graph for illustrating a polarization dependency of the coupling efficiency.

FIG. 10 shows plots of the difference in coupling efficiency between the input x-polarized wave and the input y-polarized wave, that is, the polarization dependency of the coupling efficiency. In FIG. 10, values indicated by circular dots indicate differences in coupling efficiency of the optical waveguide connection structure 1 according to this embodiment, which has the bonding layer 130 provided with the lens portion 131. Values indicated by square dots indicate differences in coupling efficiency of the optical waveguide connection structure 1B according to the prior art example, which does not have the lens portion 131.

As shown in FIG. 10, the optical waveguide connection structure 1 according to this embodiment has an improved polarization dependency of the coupling efficiency compared with the optical waveguide connection structure 1B according to the prior art example.

As described above, with the optical waveguide connection structure 1 according to this embodiment, since the space between the end face of the Si waveguide 100 and the end face of the optical fiber 120 with the recess 123 formed therein is filled with the bonding layer 130, which is provided with the lens portion 131, the mode field plane of the light emitted from the Si waveguide 100 can be made closer to a plane wave. As a result, the coupling efficiency between the Si waveguide 100 and the optical fiber 120 can be improved.

[Modification]

Next, a modification of this embodiment will be described with reference to FIG. 11.

Figure 11:
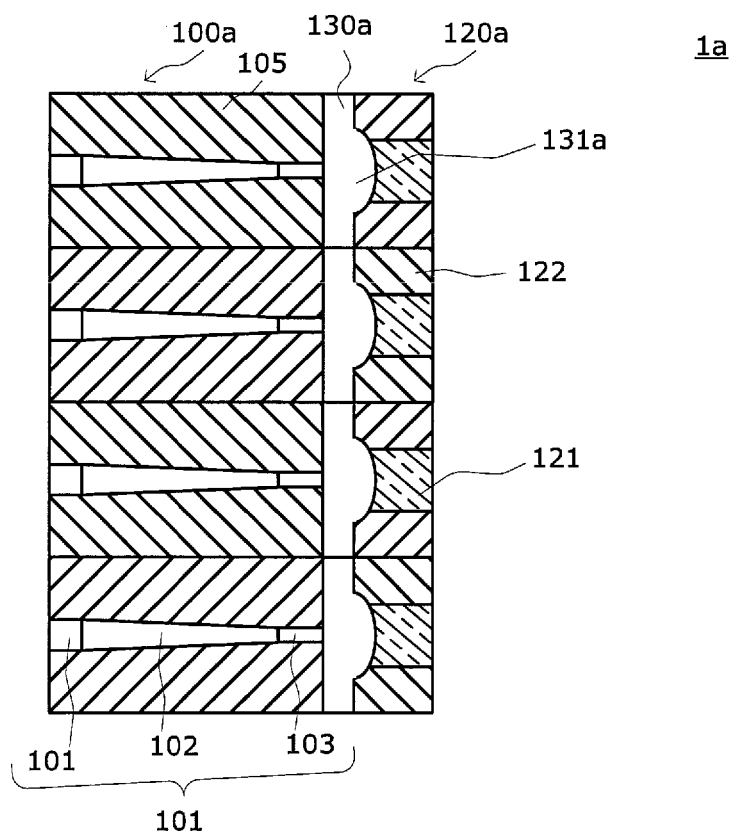
FIG. 11 is a diagram showing an optical waveguide connection structure according to a modification of the embodiment.

As shown in FIG. 11, an optical waveguide connection structure 1a according to a modification of this embodiment includes an array of Si waveguides 100a, optical fibers 120a, and bonding layers 130a each having a lens portion 131a that fill the spaces between the Si waveguides 100a and the optical fibers 120a.

In this way, the optical waveguide connection structure 1a has an array configuration. Thus, the optical waveguide connection structure 1a having a plurality of array components can be achieved to enable mode field conversion with the coupling efficiency further improved.

Although an optical waveguide connection structure according to an embodiment of the present invention has been described above, the present invention is not limited to the embodiment described above, and various modifications can be made which can occur to those skilled in the art within the scope of the invention as set forth in the claims.

Although the embodiment has been described with regard to an example where the core 101 and the cladding 105 of the Si waveguide 100 are made of the Si material, the material of the core 101 and the cladding 105 is not limited to Si, and any other semiconductor, inorganic or organic material, such as a compound semiconductor, can be used, for example.

Although the embodiment has been described with regard to an example where the optical waveguide connection structure is configured to convert the mode field diameter of light propagating from the Si waveguide 100 to the optical fiber 120, the optical waveguide connection structure may be configured to guide light from the optical fiber 120 to the Si waveguide 100.

REFERENCE SIGNS LIST 1, 1a Optical waveguide connection structure
100, 100a Si waveguide
101 Core
102, 104 Core end portion
103 Tapered portion
105 Cladding
120, 120a Optical fiber
121 Fiber core
122 Fiber cladding
123 Recess
130 Bonding layer
131 Lens portion
140 Mask
150 Ion.

The invention claimed is:

1. An optical waveguide structure comprising:
a first optical waveguide comprising:
a first core whose cross-sectional area in a direction perpendicular to a direction of propagation of light through the first optical waveguide decreases toward a second optical waveguide; and
a first cladding that covers the first core;
the second optical waveguide, wherein the second optical waveguide comprises:
a second core;
a second cladding that covers the second core; and
a recess in an end face of the second optical waveguide that is facing the first optical waveguide, wherein the recess comprises a first portion extending into the second core and a second portion extending into the second cladding, wherein the first portion of the recess extends above the first core in a cross-sectional view along the direction of propagation of light through the first optical waveguide, and wherein the first portion of the recess extends below the first core in the cross-sectional view; and
a bonding layer filling a gap between an end face of the first optical waveguide and the end face of the second optical waveguide having the recess, wherein the bonding layer has a refractive index greater than a refractive index of the second core of the second optical waveguide.

2. The optical waveguide structure according to claim 1, wherein a boundary surface between the bonding layer and the recess in the end face of the second optical waveguide forms a curved surface.

3. The optical waveguide structure according to claim 2, wherein a center of curvature of the curved surface is located in the first optical waveguide.

4. The optical waveguide structure according to claim 1, wherein the cross-sectional area of the first core is smaller than a cross-sectional area of the second core of the second optical waveguide in the direction perpendicular to the direction of propagation of light.

5. A method comprising:
forming a first optical waveguide, the first optical waveguide comprising:
a first core whose cross-sectional area in a direction perpendicular to a direction of propagation of light through the first optical waveguide decreases toward a second optical waveguide; and
a first cladding that covers the first core;
forming a second optical waveguide, wherein the second optical waveguide comprising:
a second core;
a second cladding that covers the second core; and
a recess in an end face of the second optical waveguide that is facing the first optical waveguide, wherein the recess comprises a first portion extending into the second core and a second portion extending into the second cladding, wherein the first portion of the recess extends above the first core in a cross-sectional view along the direction of propagation of light through the first optical waveguide, and wherein the first portion of the recess extends below the first core in the cross-sectional view; and
bonding the first optical waveguide to the second optical waveguide using a bonding layer to fill a gap between an end face of the first optical waveguide and the end face of the second optical waveguide having the recess, wherein the bonding layer has a refractive index greater than a refractive index of the second core of the second optical waveguide.

6. The method of claim 5 further comprising etching the recess in the end face of the second optical waveguide, wherein etching the recess comprises plasma etching through an opening in a mask.

7. The method of claim 5, wherein a boundary surface between the bonding layer and the recess in the end face of the second optical waveguide forms a curved surface.

8. The method of claim 7, wherein a center of curvature of the curved surface is located in the first optical waveguide.

9. The method of claim 5, wherein the cross-sectional area of the first core is smaller than a cross-sectional area of the second core of the second optical waveguide in the direction perpendicular to the direction of propagation of light.

* * * * *